H. F. HEYCOCK.
PNEUMATIC TIRE.
APPLICATION FILED MAY 7, 1913.

1,103,877.

Patented July 14, 1914.

UNITED STATES PATENT OFFICE.

HAROLD FREDERICK HEYCOCK, OF DUNEDIN, NEW ZEALAND.

PNEUMATIC TIRE.

1,103,877. Specification of Letters Patent. Patented July 14, 1914.

Application filed May 7, 1913. Serial No. 766,234.

*To all whom it may concern:*

Be it known that I, HAROLD FREDERICK HEYCOCK, a citizen of the Dominion of New Zealand, and residing at Montpelier street, Dunedin, in the Provincial District of Otago, in the Dominion of New Zealand, have invented certain new and useful Improvements in Pneumatic Tires, of which the following is a specification.

This invention relates to pneumatic tires and provides improvements whereby the effects of puncture are minimized.

The invention consists in providing a plurality of cells made of rubber and inclosed in canvas or other casings. The cells are circular and adapted to fit or pack transversely within the usual tire cover. The cells are perforated and have sleeves turned inwardly at each side. A metal tube concentric with the tire cover passes through the cells, which are arranged side by side and sufficient in number to fill the cover. The tube has small holes around its circumference, a hole being provided for each cell and between the sleeves thereof. A nozzle is provided upon the tube for attaching an inflation pump. The cells are held in position by washers affixed to the tube in any suitable manner, as for example, by making the washers in halves and providing pins projecting from the halves, and fitting holes formed in said tube. The half washers are held together by an external rubber band. A rubber tube fits the interior of the metal tube and has a nozzle adapted to fit an inflation pump. After the cells have been inflated by a pump connected to the metal tube, the air in the rubber tube is compressed to close the holes in the metal tube and retain the compressed air in the cells. The metal tube and its rubber tube are gapped and provided with a union nut for the purpose of threading the cells on the said metal tube.

The invention is illustrated in the accompanying drawing:—

Figure 1:
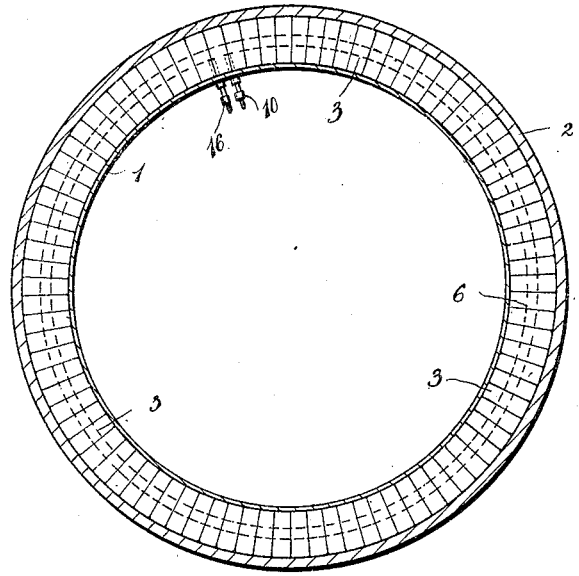
Figure 2:
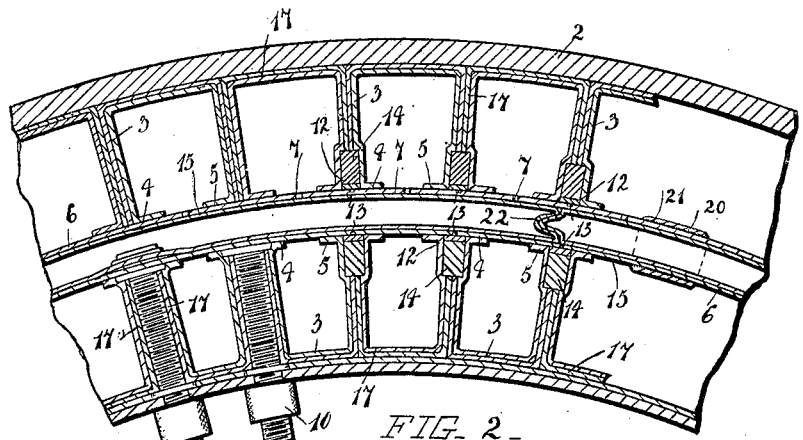
Figures 3, 4, 5:
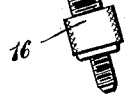

Figure 1, is a vertical section of the wheel rim fitted with the invention. Fig. 2, is a vertical section of part of the wheel rim on a larger scale showing the invention. Fig. 3, a perspective view of a washer. Fig. 4, is a sectional perspective view of a rubber cell. Fig. 5, is a perspective view of a canvas cover.

The rim 1 and the outer cover 2 are of ordinary construction. A plurality of circular cells 3 adapted to fit transversely within the cover and rim have sleeves 4 and 5 which turn inwardly. A metal tube 6 concentric or approximately concentric with the tire cover passes through the cells 3 and fits within the sleeves 4 and 5. Small holes 7 form communication between the tube 6 and the cells 3. A nozzle 10 is provided upon the tube 6 and is adapted to be attached to an ordinary inflation pump. The cells 3 are held in position by washers 12 which are affixed to the tube 6 by making the washers in half and providing pins 13 projecting into the washers and fitting holes formed in the tube 6, the said halves of the washer being held together by a rubber band 14. A rubber tube 15 fits the interior of the tube 6 and has a nozzle 16 adapted to fit an ordinary inflation pump. Each of the cells 3 is surrounded by a cover 17 of canvas or the like material which is shaped to correspond to the form which the cell 3 assumes when inflated in position in the tire.

To inflate the tire, air is pumped through the nozzle 10 while the tube 15 is deflated. The air passes through the holes 7 into cells 3 which are thereby inflated, the pressure of the air closing the sleeves 4 and 5 around the tube 6 and making air tight joints. After the cells have been sufficiently inflated air is pumped into the tube 15 through the nozzle 16 until the pressure in the said tube 15 is sufficient to close the holes 7 and retain the compressed air in the cells 3.

The metal tube 6 is gapped at 20, the ends being united by union nut 21 and the tube 15 is gapped at 22 so that the ends of the said tubes may be separated for the purpose of passing the cells 3 and rubber washers 14 upon the tube 6. If any one or more of the cells 3 should be punctured, then the air will still be retained in the cells which have not been injured.

What I do claim and desire to secure by Letters Patent of the United States is:—

1. A tire comprising an outer casing, a plurality of inflatable cells arranged within said casing, said cells having inwardly turned sleeves, a metal tube passing centrally through said cells concentric with said casing and embraced by said sleeves, said tube having apertures opening into said cells, cell-positioning means surrounding said tube, a rubber tube within said metal tube, and independent means for separately inflating said cells and said rubber tube.

2. A tire comprising an outer casing, a plurality of inflatable cells arranged within said casing, a metal tube passing centrally through said cells and concentric with said casing, said tube having apertures opening into said cells, cell positioning means detachably carried by and surrounding said metal tube, a rubber tube within said metal tube, and means for independently inflating said cells and said rubber tube, said cells being provided with sleeves embracing said metal tube and coacting with said positioning means to form an air tight joint when said cells are inflated.

In testimony whereof I have signed my name to this specification in the presence of two witnesses.

HAROLD FREDERICK HEYCOCK.

Witnesses:
ERNEST SMITH BALDWIN,
CECIL BALFOUR MELVILLE.